US012429184B2

(12) United States Patent
Kim et al.

(10) Patent No.: US 12,429,184 B2
(45) Date of Patent: Sep. 30, 2025

(54) OPTICAL MODULE FOR MOBILITY VEHICLES

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Hyeong Seon Kim, Anyang-si (KR); Young Geun Jun, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/516,117

(22) Filed: Nov. 21, 2023

(65) Prior Publication Data

US 2025/0027627 A1 Jan. 23, 2025

(30) Foreign Application Priority Data

Jul. 20, 2023 (KR) ........................ 10-2023-0094720

(51) Int. Cl.
*F21S 41/32* (2018.01)
*F21S 41/265* (2018.01)
*F21S 41/663* (2018.01)
*F21Y 115/10* (2016.01)

(52) U.S. Cl.
CPC ........... *F21S 41/265* (2018.01); *F21S 41/323* (2018.01); *F21S 41/663* (2018.01); *F21Y 2115/10* (2016.08)

(58) Field of Classification Search
CPC ...... F21S 41/265; F21S 41/663; F21S 41/321; F21S 43/26; F21S 41/285; F21S 41/26; F21W 2107/10
See application file for complete search history.

(56) References Cited

U.S. PATENT DOCUMENTS

2010/0085769 A1* 4/2010 Tatsukawa ............ F21S 41/155 362/539
2015/0023040 A1* 1/2015 Tatsukawa .............. F21S 41/26 362/517
2019/0154222 A1* 5/2019 Iwasaki ................. F21S 41/663
2022/0065418 A1* 3/2022 Lee ......................... F21S 43/31

FOREIGN PATENT DOCUMENTS

JP 2019036402 A * 3/2019 ............. F21S 41/25
KR 20130048540 A 5/2013
WO WO-2020179471 A1 * 9/2020 ............ F21S 41/151

OTHER PUBLICATIONS

Search English translation of WO-2020179471-A1 (Year: 2020).*
ESPACENET English translation of JP 2019036402 A (Year: 2019).*

* cited by examiner

*Primary Examiner* — Omar Rojas Cadima
(74) *Attorney, Agent, or Firm* — Lempia Summerfield Katz LLC

(57) ABSTRACT

An optical module for mobility vehicles reduces an overall size of an optical system and thus facilitates a package configuration. The optical module for mobility vehicles also ensures a sufficient amount of light and high optical efficiency are through efficient operation of light sources and improves quality of illumination images projected onto a light irradiation area.

16 Claims, 14 Drawing Sheets

FIG. 13 "PRIOR ART"

OPTICAL MODULE FOR MOBILITY VEHICLES

CROSS-REFERENCE TO RELATED APPLICATION

This application claims the priority to and the benefit of Korean Patent Application No. 10-2023-0094720, filed on Jul. 20, 2023 in the Korean Intellectual Property Office, the disclosure of which is incorporated herein by reference.

TECHNICAL FIELD

The present disclosure relates to an optical module for mobility vehicles, which improves optical efficiency and includes an optical system reduced in size.

BACKGROUND

In general, mobility vehicles are provided with various types of lamps in order to secure a field of view in a driving direction at night and to inform other mobility vehicles or the like of the driving state thereof.

Such lamps include a headlamp, a fog light, a turn signal light, a brake light, and a backup light, which radiate light in different directions according to their own purposes.

In particular, a headlamp is configured to radiate a low beam in a normal driving situation and to radiate a high beam in a special situation.

According to recent trends, the overall size of an optical system applied to future mobility vehicles has been gradually reduced. However, as an optical system is slimmed, the optical system may not meet a light quantity requirement prescribed by regulations and thus may not secure a front field of view.

The information disclosed in this Background section is only for enhancement of understanding of the general background of the present disclosure, and should not be taken as an acknowledgement or any form of suggestion that this information forms the related art already known to a person having ordinary skill in the art.

SUMMARY

The present disclosure has been made in view of the above problems, and it is an object of the present disclosure to provide an optical module for mobility vehicles. The optical module that reduces the overall size of its optical system, facilitates a package configuration, provides a sufficient amount of light and high optical efficiency through efficient operation of light sources. In addition, the optical module enhances the quality of illumination images projected onto a light irradiation area.

In an aspect of the present disclosure, the above and other objects can be accomplished by providing an optical module for mobility vehicles. The optical module includes a plurality of light source units configured to emit light toward focal points. The optical module also includes a transmission lens configured to receive light emitted from the plurality of light source units. The transmission lens includes a plurality of transmission portions formed so as to respectively match the plurality of light source units. Each of the plurality of transmission portions includes a light incident surface formed as an aspherical surface and includes a light emitting surface having a plurality of cells.

The transmission lens may be formed so as to extend in a lateral direction. The plurality of transmission portions may be arranged in the lateral direction. The plurality of light source units may be spaced apart from each other in the lateral direction so as to respectively match the plurality of transmission portions.

Each of the plurality of light source units may include a light source configured to emit light and a reflector configured to reflect light emitted from the light source so that the light travels to a corresponding one of the plurality of transmission portions of the transmission lens.

The reflector may include a reflective surface formed in an elliptical shape in a longitudinal direction. The light source may be located at a first focal point defined by the elliptical shape of the reflective surface. The light emitting surface of the transmission lens may be located at a second focal point defined by the elliptical shape of the reflective surface.

The reflector may be disposed so that light travels below a third focal point defined by the light incident surface of a corresponding of one of the plurality transmission portions.

The light source may be disposed above the reflector so that light emitted from the light source is reflected by the reflector and passes through the light incident surface and the light emitting surface of a corresponding one of the plurality of transmission portions while traveling from below to above.

The reflector may include a reflective surface formed in a parabolic shape in the lateral direction.

A plurality of light sources may be arranged in the lateral direction to emit light to the reflector. The light incident surface of each of the plurality of transmission portions of the transmission lens may be formed to be aspherical in the lateral direction.

The aspherical surface of each of the plurality of transmission portions of the transmission lens may have a regular curvature. Each of the plurality of light source units and a corresponding one of the plurality of transmission portions may be spaced apart from each other by a regular distance.

As the plurality of transmission portions of the transmission lens has a larger radius of curvature, the plurality of light source units may be disposed farther forward so that spacing distances between the plurality of transmission portions and the plurality of light source units decrease. As the plurality of transmission portions of the transmission lens has a smaller radius of curvature, the plurality of light units may be disposed farther backward so that spacing distances between the plurality of transmission portions and the plurality of light source units increase.

The transmission lens may be formed such that the light incident surface of at least one of the plurality of transmission portions is tilted in the lateral direction with respect to light incident surfaces of other transmission portions.

One of the plurality of light source units, matching the tilted transmission portion, may be disposed at a position shifted in the lateral direction by a tilted angle with respect to the other transmission portions.

The plurality of light source units may be disposed so as to emit light to a light irradiation area. Some of the plurality of light source units may be provided so that light emitted therefrom is biased across the center of the light irradiation area.

Some of the plurality of light source units may be disposed eccentrically with respect to the center lines of corresponding ones of the plurality of transmission portions.

The optical module may further include partition walls provided between the plurality of light source units to isolate a combination of each of the plurality of light source units and a corresponding one of the plurality of transmission portions from other combinations.

In accordance with another aspect of the present disclosure, an optical module for mobility vehicles includes a first light source unit, a second light source unit, and a third light source unit, which are configured to emit light to a light irradiation area. The optical module for mobility vehicles also includes a transmission lens disposed in front of the first light source unit, the second light source unit, and the third light source unit. The transmission lens includes a first transmission portion, a second transmission portion, and a third transmission portion respectively matching the first light source unit, the second light source unit, and the third light source unit. Each of the first transmission portion, the second transmission portion, and the third transmission portion includes a light incident surface formed as an aspherical surface and includes a light emitting surface having a plurality of cells arranged thereon.

The first light source unit may be configured to emit light to the center of the light irradiation area. The second light source unit may be located to one side of the first light source unit and may be configured to emit light such that the light travels in an oblique direction across the center of the light irradiation area. The third light source unit may be located to the opposite side of the first light source unit and may be configured to emit light such that the light travels in an oblique direction across the center of the light irradiation area.

The second light source unit may be disposed eccentrically to one side with respect to the center line of the second transmission portion. The third light source unit may be disposed eccentrically to the opposite side with respect to the center line of the third transmission portion.

The optical module may further include a fourth light source unit configured to emit light. The light irradiation area may be divided into a hot-zone area and a sub-area. The first light source unit, the second light source unit, and the third light source unit may be provided to emit light to the hot-zone area. The fourth light source unit may be provided to emit light to the sub-area.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION

Figure 1:
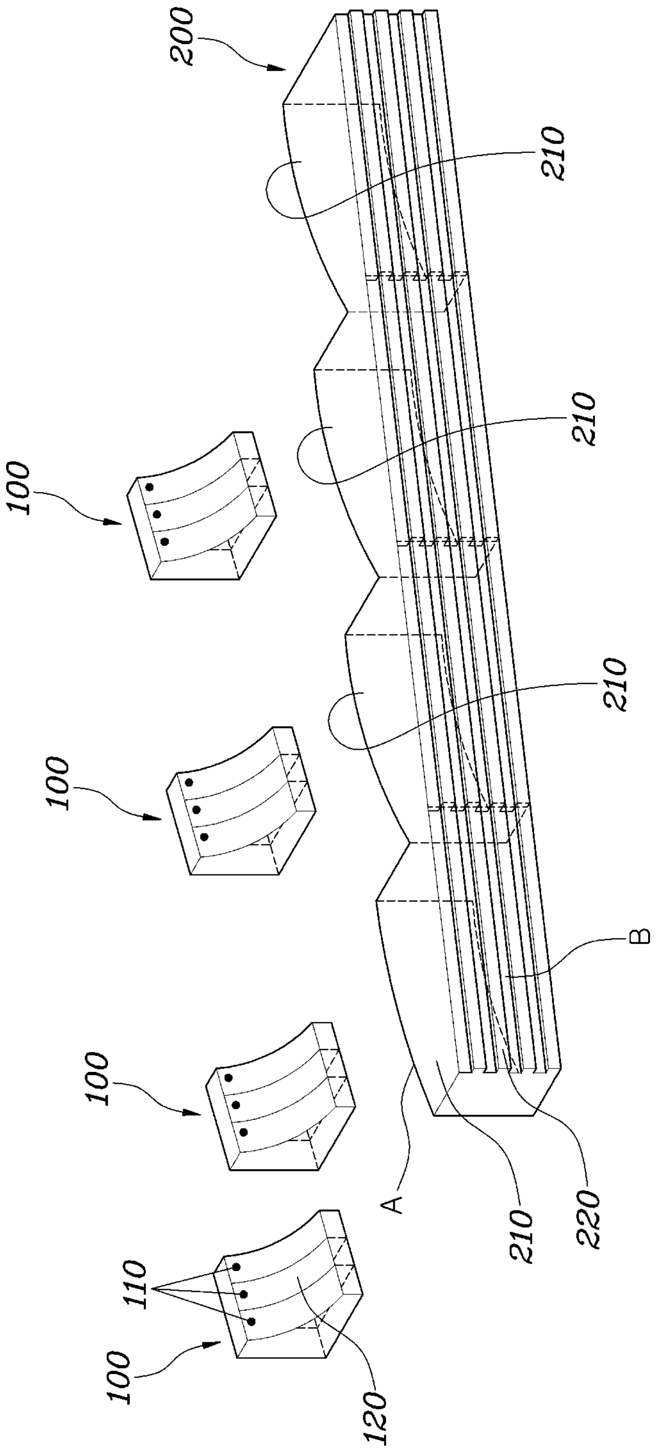
FIG. 1 is a view showing an optical module for mobility vehicles according to an embodiment of the present disclosure.

Hereinafter, the embodiments disclosed in the present disclosure are described in detail with reference to the accompanying drawings. The same or similar elements are denoted by the same reference numerals even though the elements are depicted in different drawings. Redundant descriptions thereof have been omitted.

In the following description, with respect to constituent elements used in the following description, the suffixes “module” and “unit” are used only in consideration of facilitation of description and do not have mutually distinguished meanings or functions.

In the following description of the embodiments disclosed in the present disclosure, a detailed description of known functions and configurations incorporated herein has been omitted when the detailed description may make the subject matter of the embodiments disclosed in the present specification rather unclear. In addition, the accompanying drawings are provided only for a better understanding of the embodiments disclosed in the present disclosure and are not intended to limit the technical ideas disclosed in the present disclosure. Therefore, it should be understood that the accompanying drawings include all modifications, equivalents, and substitutions within the scope and sprit of the present disclosure.

It should be understood that although the terms “first”, “second”, etc., may be used herein to describe various components, these components should not be limited by these terms. These terms are only used to distinguish one component from another component.

It should be understood that when a component is referred to as being “connected to” or “coupled to” another component, it may be directly connected to or coupled to another component, or intervening components may be present. On the other hand, when a component is referred to as being “directly connected to” or “directly coupled to” another component, there are no intervening components present.

As used herein, the singular form is intended to include the plural forms as well, unless the context clearly indicates otherwise.

It should be further understood that the terms, such as “comprises”, “comprising”, “includes”, and/or “including”, when used herein, specify the presence of stated features, integers, steps, operations, elements, components, or combinations thereof. However, these terms do not preclude the presence or addition of one or more other features, integers, steps, operations, elements, components, or combinations thereof.

In order to control the function peculiar thereto, a controller may include a communication device, which communicates with other controllers or sensors. The controller may also include a memory, which stores therein an operating system, logic commands, and input/output information. The controller may also include one or more processors, which perform determinations, calculations, and decisions necessary for control of the function peculiar thereto. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

Hereinafter, an optical module for mobility vehicles according to an embodiment of the present disclosure is described with reference to the accompanying drawings.

Figure 2:
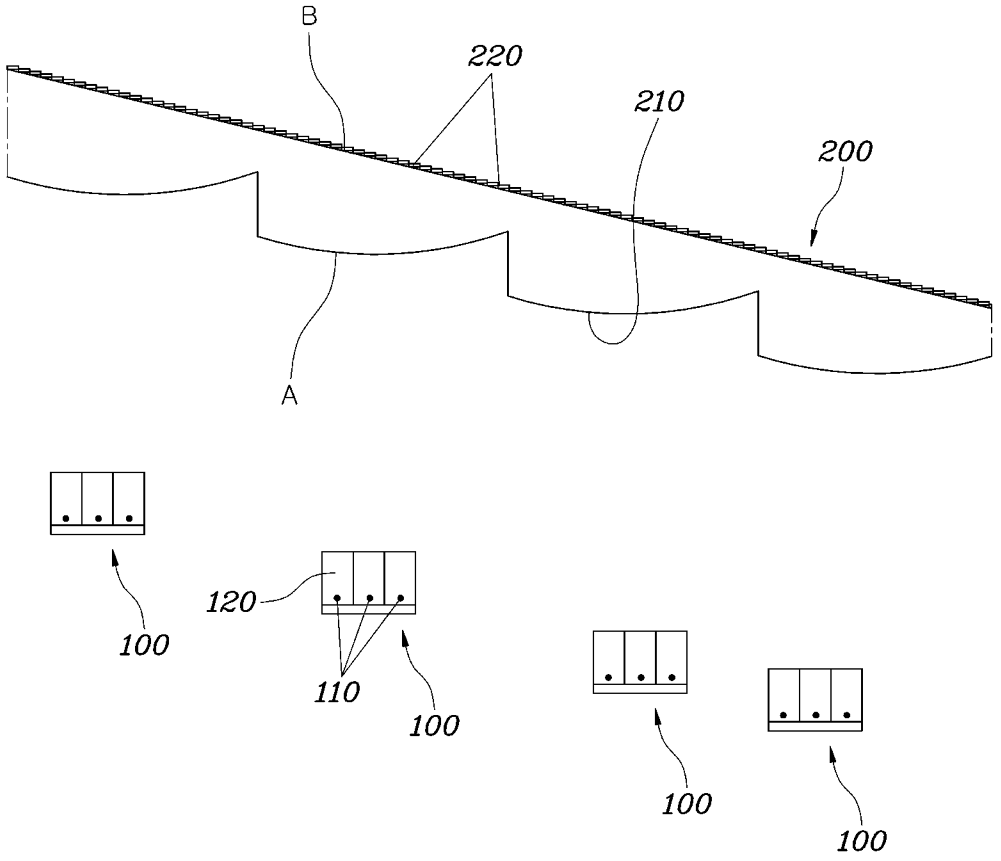
FIG. 2 is a plan view of the optical module for mobility vehicles shown in FIG. 1.

As shown in FIGS. 1 and 2, an optical module for mobility vehicles according to the present disclosure includes a plurality of light source units 100, which are configured to emit light toward focal points. The optical module also includes a transmission lens 200, which is configured to receive light emitted from the light source units 100 and includes a plurality of transmission portions 210 formed so as to respectively match the light source units 100. Each of the transmission portions 210 includes a light incident surface A formed in an aspherical shape and a light emitting surface B on which a plurality of cells 220 is arranged.

In an embodiment implemented with the light source units 100 and the transmission lens 200, a lamp design may be upgraded by slimming the transmission lens 200.

In other words, the light source units 100 are configured to emit light toward focal points, and the transmission lens 200 is provided at the focal points or around the focal points of the light emitted from the light source units 100.

Each of the light source units 100 may include a light source 110 configured to emit light and a reflector 120 configured to reflect the light emitted from the light source 110 so that the light travels to a corresponding transmission portion 210 of the transmission lens 200.

The light source 110 may be implemented as a light-emitting diode (LED). The reflector 120 may have a reflective surface to reflect the light emitted from the light source 110 so that the light travels to the transmission portion 210 of the transmission lens 200. The light source 110 and the reflector 120 may be provided in plural form. Various beam patterns may be generated through operation of individually turning on the plurality of light sources 110. The light source units 100 operate under the control of a controller. The controller may receive external signals and may transmit control signals to the light source units 100.

Figure 3:
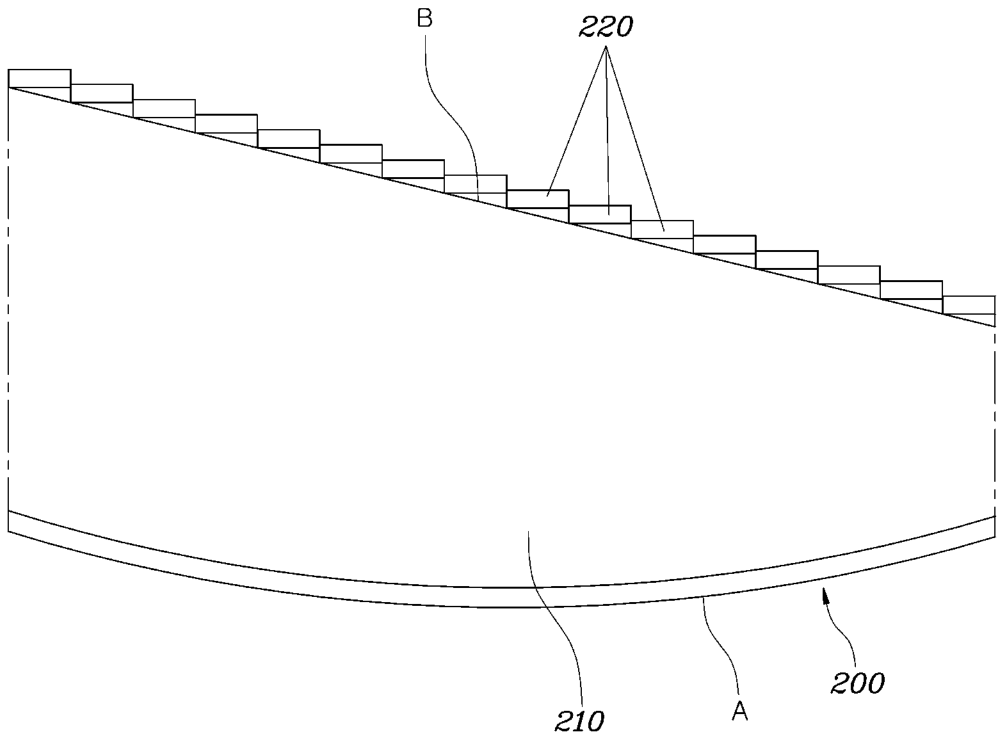
FIG. 3 is a cross-sectional view showing a transmission lens according to the present disclosure.
Figure 4:
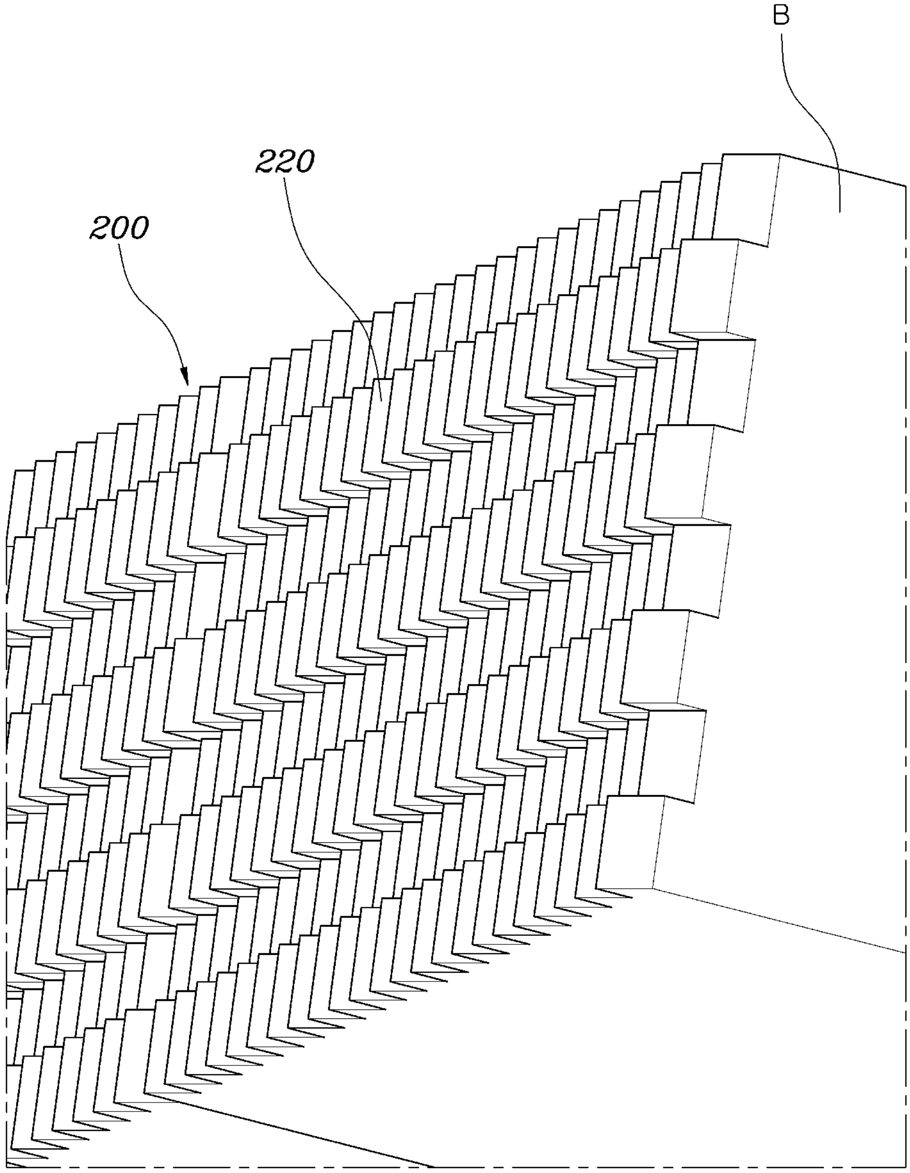
FIG. 4 is a view showing a light emitting surface of the transmission lens according to the present disclosure.

The plurality of transmission portions 210 of the transmission lens 200 is formed so as to respectively match the light source units 100. Particularly, as shown in FIGS. 3 and 4, the light incident surface A of each of the transmission portions 210 is formed in an aspherical shape, and the light emitting surface B thereof is formed such that a plurality of cells 220 is arranged. Accordingly, the light incident on the transmission lens 200 is aligned when passing through the aspherical lens and then is emitted as parallel light through the plurality of cells 220. The plurality of cells 220 of the transmission lens 200 may be arranged on the light emitting surface B in a longitudinal direction or a lateral direction, and light may be radiated forward through each of the cells 220.

The aspherical light incident surface A of each of the transmission portions 210 of the transmission lens 200 may be adjusted in radius of curvature so that light is emitted as parallel light or emitted while being focused. The light incident surface A may be designed based on the lamp requirements.

According to an embodiment of the present disclosure, the transmission lens 200 may be formed so as to extend in the lateral direction. Accordingly, the transmission portions 210 may be arranged in the lateral direction, and the plurality of light source units 100 may be spaced apart from each other in the lateral direction so as to respectively match the transmission portions 210.

In this way, the transmission lens 200 may be formed so as to extend in the lateral direction and may be slimmed through the structures of the light source units 100 and the transmission portions 210. Thus, a lamp design may be upgraded. Accordingly, the transmission portions 210 of the transmission lens 200 may be arranged in the lateral direction, and the plurality of light source units 100 may be spaced apart from each other in the lateral direction so as to respectively match the transmission portions 210.

In detail, the reflector 120 may be formed such that the reflective surface thereof has an elliptical shape in the longitudinal direction. The light source 110 may be located at a first focal point F1 defined by the elliptical shape, and the light emitting surface B of the transmission lens 200 may be located at a second focal point F2 defined by the elliptical shape.

The reflector 120 of the light source unit 100 is provided behind the transmission lens 200, and matches a corresponding one of the transmission portions 210 of the transmission lens 200 so that the light emitted from the light source 110 is incident on a corresponding one of the transmission portions 210.

Since the light incident surface A of each of the transmission portions 210 of the transmission lens 200 is formed in an aspherical shape, the reflector 120 may be provided at a focal point or around a focal point defined by the aspherical shape of the transmission portion 210. That is, the position of a portion onto which light is finally projected may be determined depending on whether the reflector 120 is disposed at a focal point or around a focal point defined by the aspherical shape of the transmission portion 210. For example, when the reflector 120 is located close to a focal point defined by the aspherical shape of the transmission portion 210, a portion onto which light is projected may be disposed close to the center of the light irradiation area, and when the reflector 120 is located far away from a focal point defined by the aspherical shape of the transmission portion 210, a portion onto which light is projected may be disposed far away from the center of the light irradiation area. In this way, the position of a light-projected portion relative to the light irradiation area may be adjusted by adjusting the position of each of the light source units 100.

Figure 5:
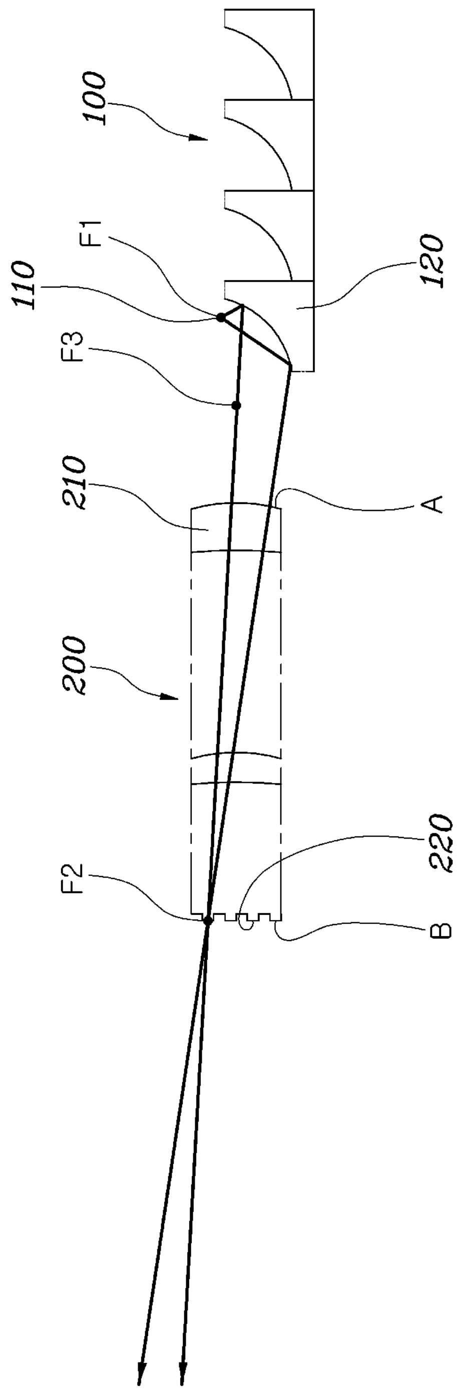
FIG. 5 is a view showing a light traveling path in the optical module for mobility vehicles according to the present disclosure.

In particular, the reflective surface of the reflector 120 may be formed in an elliptical shape in the longitudinal direction so that light reflected from the reflective surface is focused. As shown in FIG. 5, the light source 110 is located at a first focal point F1 defined by the elliptical shape of the reflective surface of the reflector 120. The light emitting surface B of the transmission lens 200 is located at a second focal point F2 defined by the elliptical shape of the reflective surface of the reflector 120. Accordingly, the light emitted from the light source 110 may be reflected by the reflector 120, may be focused on the light emitting surface B of the transmission portion 210, and may then be emitted through the plurality of cells 220.

In addition, the reflector 120 may be disposed so that light travels below a third focal point F3 defined by the light incident surface A of the transmission portion 210.

In other words, since the light source 110 is disposed above the reflector 120, the light emitted from the light source 110 is reflected by the reflector 120 and passes through the light incident surface A and the light emitting surface B of the transmission portion 210 while traveling from below to above.

Since the reflector 120 is formed in an elliptical shape in the longitudinal direction, the light emitted from the light source 110 is focused and travels toward the transmission portion 210. The light source 110 disposed above the reflector 120 emits light downwards, and the light reflected by the reflector 120 travels forward and upward toward the second focal point F2.

In particular, since the reflector 120 is disposed such that the light emitted from the light source 110 and reflected by the reflector 120 travels below the third focal point F3 defined by the light incident surface A of the transmission portion 210, the light emitted through the transmission portion 210 may be distributed upward. Accordingly, the reflector 120 may be located below the transmission lens 200, and the light emitted from the light source 110 may travel below the third focal point F3 defined by the light incident surface A of the transmission portion 210. As a result, it is easy to meet requirement of a vertical viewing angle of the light emitted through the transmission portion 210 when designing the lamp. In general, the beam pattern of the lamp has a vertical viewing angle of −2° to +5°. Such a vertical viewing angle may be satisfied since the light emitted through the transmission lens 200 travels upward.

Figure 6:
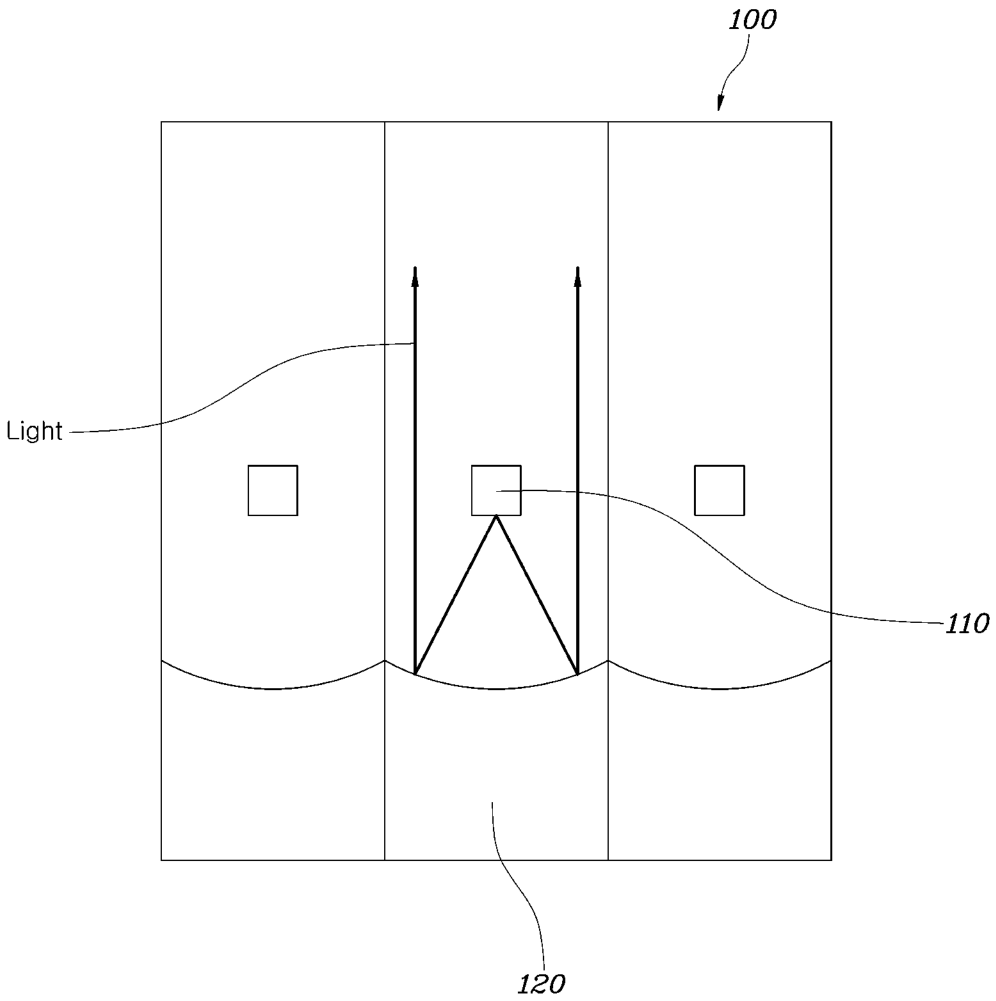
FIG. 6 is a view showing a light source and a reflector of a light source unit according to the present disclosure.

In addition, as shown in FIG. 6, since the reflector 120 is formed such that the reflective surface thereof forms a parabolic curve in the lateral direction, the light reflected by the reflector 120 travels in the form of parallel light toward the transmission lens 200. Accordingly, when the light emitted from the light source 110 has a horizontal directional characteristic, the light may be incident on the transmission portion 210 of the transmission lens 200 in the form of parallel light.

Accordingly, when the light emitted from the light source 110 is reflected by the reflector 120, the light may be aligned in the form of parallel light and may be radiated through the transmission lens 200 while satisfying the vertical viewing angle in the upward direction.

Meanwhile, in the light source unit 100 according to the present disclosure, the light source 110 is provided in plural form, and the plurality of light sources 110 is arranged in the lateral direction so as to emit light to the reflectors 120.

For example, as shown in FIG. 1, the light source unit 100 may be provided in plural form, and a plurality of light sources 110 and reflectors 120 respectively matching the light sources 110 may be provided in each of the light source units 100. Accordingly, it is possible to form various beam patterns by selectively turning on the light sources 110.

In addition, the transmission lens 200 may be formed so as to extend in the lateral direction, and the light incident surfaces A of the transmission portions 210 may be formed to be aspherical in the lateral direction. Accordingly, the plurality of light source units 100 may also be arranged in the lateral direction so as to respectively match the transmission portions 210.

According to another embodiment of the present disclosure, the arrangement of the light source units may be adjusted depending on the shape of the transmission portions 210 of the transmission lens 200.

As illustrated in FIG. 2, the aspherical surfaces of the transmission portions 210 of the transmission lens 200 are formed to have the same curvature as each other. Spacing distances between the light source units 100 and the transmission portions 210 respectively corresponding thereto are identical to each other.

In other words, because the curvatures of the aspherical surfaces of the transmission portions 210 are identical, the light source units 100 may be disposed at the same distance from the transmission portions 210 respectively corresponding thereto based on the focal points defined by the shapes of the light incident surfaces of the respective transmission portions 210.

When the transmission lens 200 is formed so as to extend in an oblique direction, the transmission portions 210 may be arranged in the oblique direction, and the light source units 100 may be arranged in the oblique direction so as to be disposed at the same distance from the transmission portions 210 respectively corresponding thereto based on the focal points defined by the shapes of the light incident surfaces of the respective transmission portions 210. Accordingly, when the light emitted from each of the light source units 100 passes through the transmission lens 200, a beam pattern may be formed in a certain light irradiation area. Even when the transmission lens 200 is formed in any other shape, rather than extending in the oblique direction, it is possible to form uniform beam patterns in the light irradiation areas by arranging the light source units 100 at the focal points defined by the shapes of the aspherical surfaces of the respective transmission portions 210.

Meanwhile, as the radius of curvature of the transmission portion 210 of the transmission lens 200 increases, the light source unit 100 is disposed farther forward so that the spacing distance between the light source unit 100 and the transmission portion 210 decreases. Conversely, as the radius of curvature of the transmission portion 210 of the transmission lens 200 decreases, the light source unit 100 is disposed farther backward so that the spacing distance between the light source unit 100 and the transmission portion 210 increases.

Figure 7:
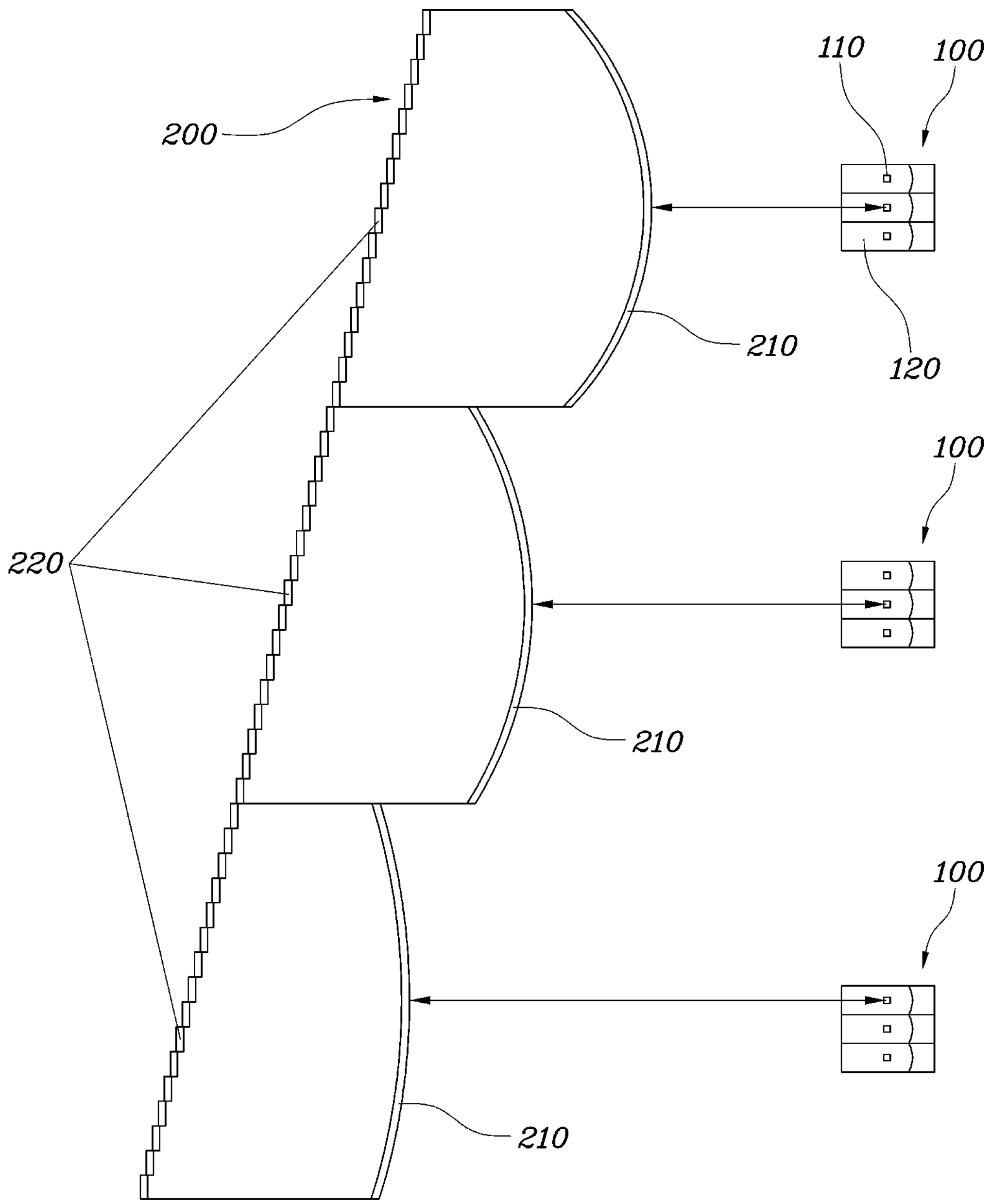
FIG. 7 is a view showing arrangement of light source units according to the shape of the transmission lens in the optical module for mobility vehicles according to the present disclosure.

As shown in FIG. 7, the position of the light source unit 100 may be adjusted depending on the radius of curvature of the aspherical surface of the transmission portion 210 of the transmission lens 200.

For example, referring to FIG. 7, since the radius of curvature of the aspherical surface of the transmission portion 210 disposed at the upper position is larger than that of the transmission portion 210 disposed at the intermediate position, a distance of a focal point defined by the aspherical shape of the transmission portion 210 disposed at the upper position decreases. Accordingly, when the light source unit 100 matching the transmission portion 210 disposed at the upper position is disposed at the focal point defined by the corresponding transmission portion 210, the spacing distance between the transmission portion 210 and the light source unit 100 may decrease. As a result, although the radius of curvature of the aspherical surface is large, the light emitted from the light source unit 100 may be radiated in the form of parallel light through the transmission portion 210.

In addition, referring to FIG. 7, because the radius of curvature of the aspherical surface of the transmission portion 210 disposed at the lower position is smaller than that of the transmission portion 210 disposed at the intermediate position, a distance of a focal point defined by the aspherical shape of the transmission portion 210 disposed at the lower position increases. Accordingly, when the light source unit 100 matching the transmission portion 210 disposed at the lower position is disposed at the focal point defined by the corresponding transmission portion 210, the spacing distance between the transmission portion 210 and the light source unit 100 may increase. As a result, although the radius of curvature of the aspherical surface is small, the light emitted from the light source unit 100 may be radiated in the form of parallel light through the transmission portion 210.

In this way, in the present disclosure, the position of the light source unit 100 may be adjusted depending on the radius of curvature of the aspherical surface of each of the transmission portions 210. Accordingly, even when the transmission lens 200 is formed so as to extend in the oblique direction or is formed in any other shape, the light source units 100 may be regularly arranged in a straight line by adjusting the radii of curvature of the transmission portions 210. As such, since the positions of the light source units 100 are adjusted by adjusting the radii of curvature of the aspherical surfaces of the transmission portions 210, it is possible to secure a mounting space of the light source units 100 and freedom of mounting thereof.

Figure 8:
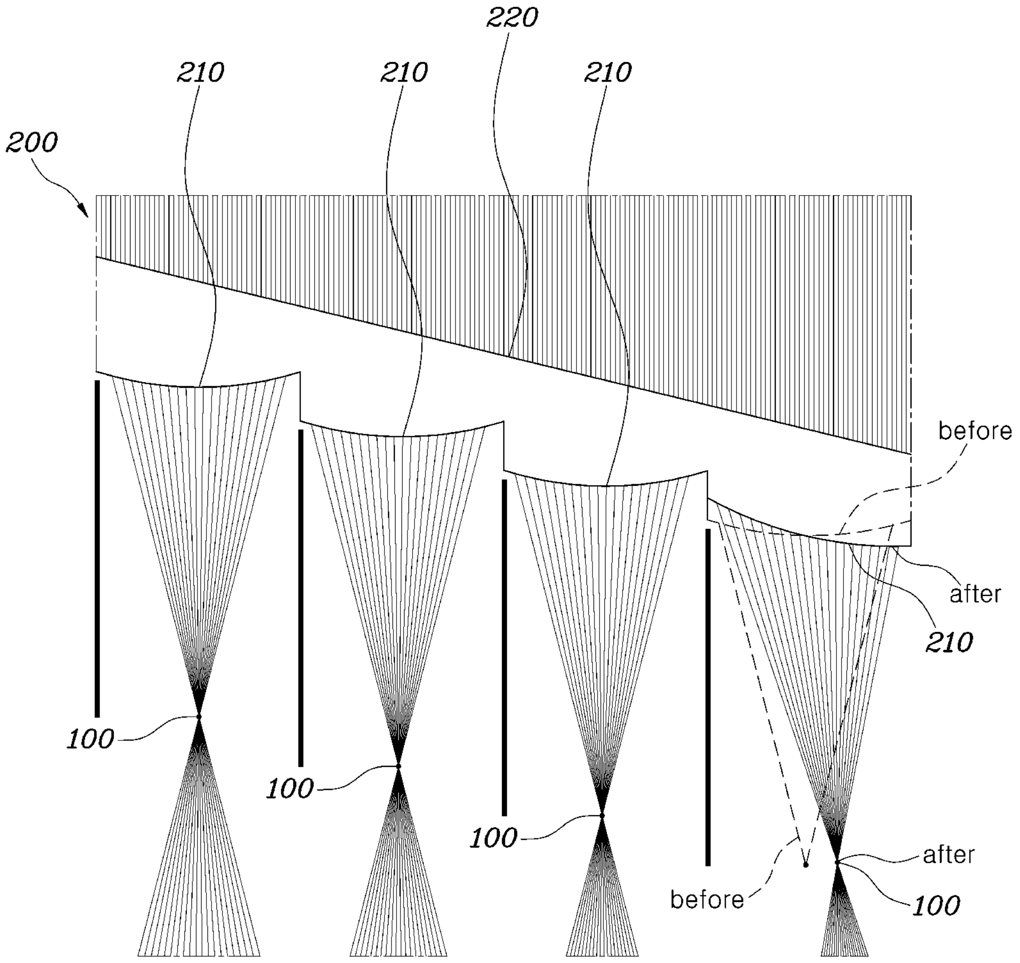
FIG. 8 is a view showing an optical module for mobility vehicles according to another embodiment of the present disclosure.

In an embodiment, as shown in FIG. 8, the transmission lens 200 may be formed such that the light incident surface A of at least one of the plurality of transmission portions 210 is tilted in the lateral direction with respect to the light incident surfaces of the other transmission portions 210.

In addition, the light source unit 100 matching the tilted transmission portion 210 may be disposed at a position shifted in the lateral direction by a tilted angle with respect to the other transmission portions 210.

In other words, the light emitted from each of the light source units passes through a corresponding one of the transmission portions 210 of the transmission lens 200 to form a beam pattern at a target point. Here, since the transmission lens 200 is formed so as to extend in the lateral direction and the transmission portions 210 are arranged at regular intervals, the light incident surface A of at least one of the plurality of transmission portions 210 may be tilted in the lateral direction with respect to the light incident surfaces of the other transmission portions 210 in order to distribute the beam pattern within a viewing angle of a target point.

In other words, when forming a beam pattern at a target point, there may be a transmission portion 210 that projects a beam pattern onto a target point and a transmission portion 210 that projects a beam pattern onto a point outside a viewing angle of a target point. In this case, the transmission portion 210 that projects a beam pattern onto a point outside a viewing angle of a target point is formed so as to be tilted in the lateral direction with respect to the other transmission portions 210. The light source unit 100 matching the tilted transmission portion 210 is adjusted in position according to the tilting direction, with a result that light passing through the tilted transmission portion 210 may form a beam pattern within the viewing angle of the target point.

As illustrated in FIG. 8, if the transmission portion 210 disposed at the rightmost position is formed so as not to be tilted, light passing through the corresponding transmission portion 210 may be projected onto a point outside a light irradiation area. However, if the corresponding transmission portion 210 is tilted and the light source unit matching 100 the corresponding transmission portion 210 is adjusted in position according to the tilting, light emitted from the light source unit 100 may travel to a target point in the form of parallel light through the tilted transmission portion 210 and may form a beam pattern.

Meanwhile, the plurality of light source units 100 is disposed so as to emit light to the light irradiation area. Some of the light source units 100 may be provided so that light emitted therefrom is biased across the center of the light irradiation area.

Figure 9:
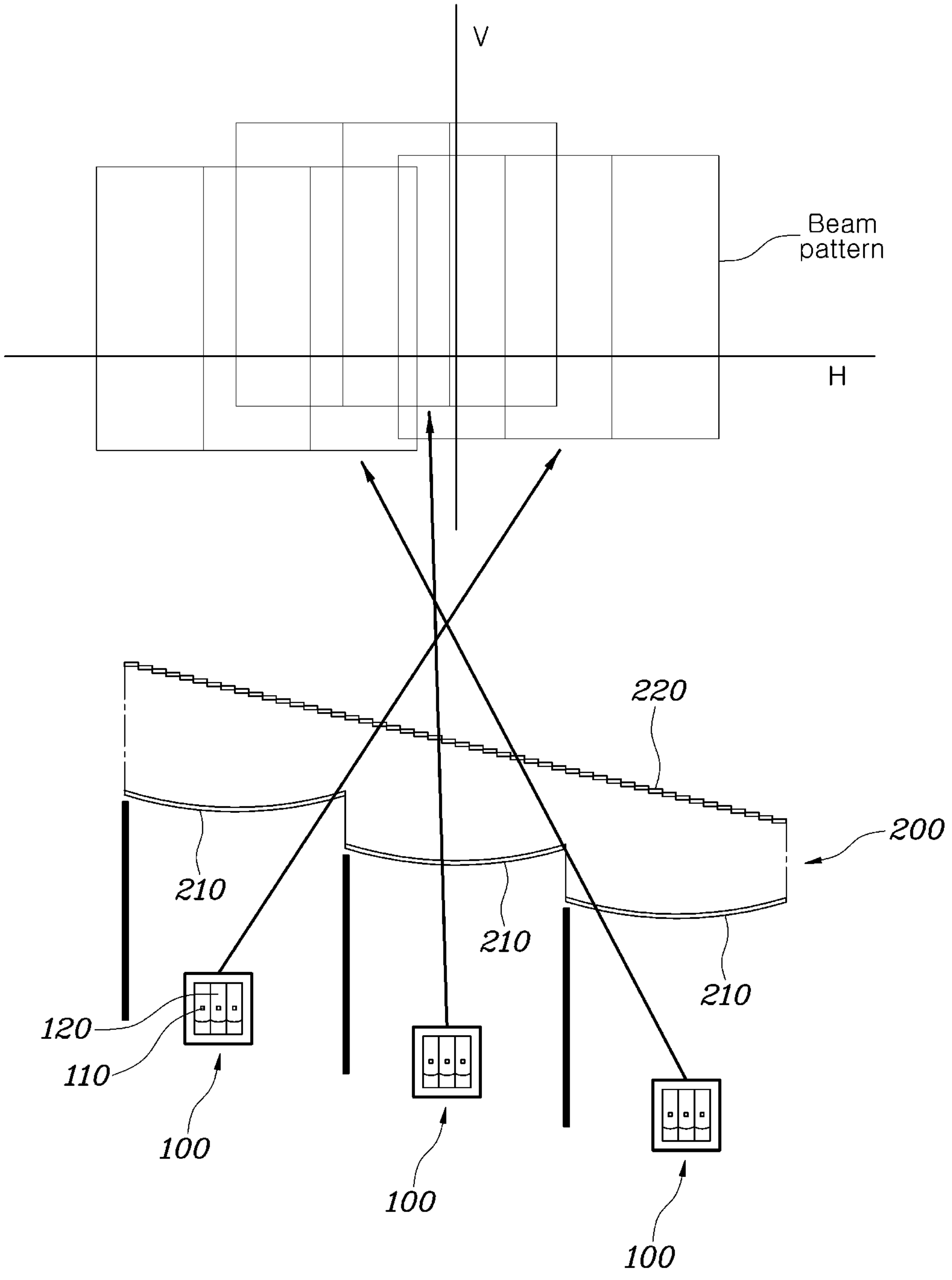
FIG. 9 is a view for explaining projection of beam patterns in the optical module for mobility vehicles according to the embodiment of the present disclosure.

As shown in FIG. 9, the light source unit 100 is provided in plural form, and each of the light source units 100 emits light to form a beam pattern in the light irradiation area. Here, the light source units 100 other than the light source unit 100 disposed so as to be aligned with the light irradiation area may be disposed such that travel directions of the light emitted therefrom intersect each other. Accordingly, a range of the beam patterns formed by the light source units 100 may be secured, and thus the beam patterns may be clearly formed in the light irradiation area.

In addition, some of the light source units 100 may be disposed eccentrically with respect to the center lines of the transmission portions 210 respectively corresponding thereto.

For example, among the light source units 100 emitting light to the light irradiation area to form beam patterns, the light source unit 100 located to the left of the center light source unit 100 may be disposed eccentrically to the left with respect to the center line of the transmission portion 210 corresponding thereto. Thus, a beam pattern may be projected so as to be biased to the right side of the light irradiation area. In addition, the light source unit 100 located to the right of the center light source unit 100 may be disposed eccentrically to the right with respect to the center line of the transmission portion 210 corresponding thereto. Thus, a beam pattern may be projected so as to be biased to the left side of the light irradiation area.

Accordingly, the center light source unit 100 emits light forward toward the light irradiation area, and the left and right light source units 100 emit light toward the light irradiation area such that travel directions of the light emitted therefrom intersect each other. As a result, even when the range of the light irradiation area increases, beam patterns may be formed in the light irradiation area.

In addition, since the left light source unit 100 and the right light source unit 100 are spaced apart from the center light source unit 100 in a direction away from each other, the influence of heat generated from the respective light source units may be reduced, and heat dissipation performance may be ensured.

Meanwhile, as shown in FIG. 9, partition walls 300 may be provided between the plurality of light source units 100 so that a combination of a light source unit 100 and a transmission portion 210 matching each other is isolated from the other combinations.

Because the partition walls 300 are provided between the plurality of light source units 100 and are formed so as to extend to the transmission lens 200, a combination of a light source unit 100 and a transmission portion 210 matching each other is isolated from the other combinations. The partition walls 300 are configured not to transmit light therethrough. Thus, light emitted from each of the light source units 100 may be prevented from being incident on transmission portions 210 other than a transmission portion 210 corresponding thereto. Accordingly, when the light source units 100 are selectively turned on, it is possible to prevent occurrence of a light flashing phenomenon or a light spreading phenomenon due to incidence of light on transmission portions 210 matching light source units 100 other than the turned-on light source unit 100. Thus, beam pattern quality may be improved.

Figure 10:
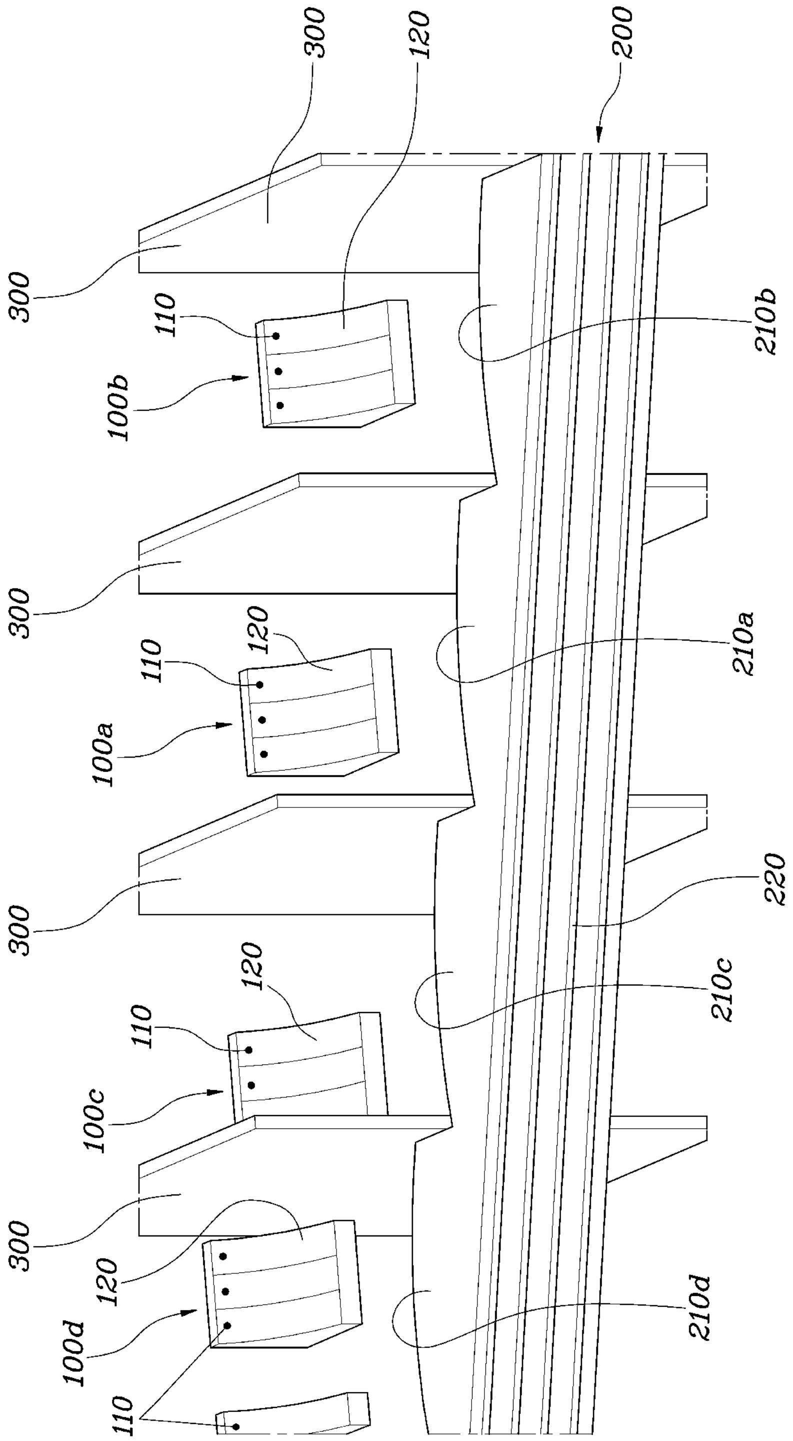
FIG. 10 is a view showing an optical module for mobility vehicles of the present disclosure.
Figure 11:
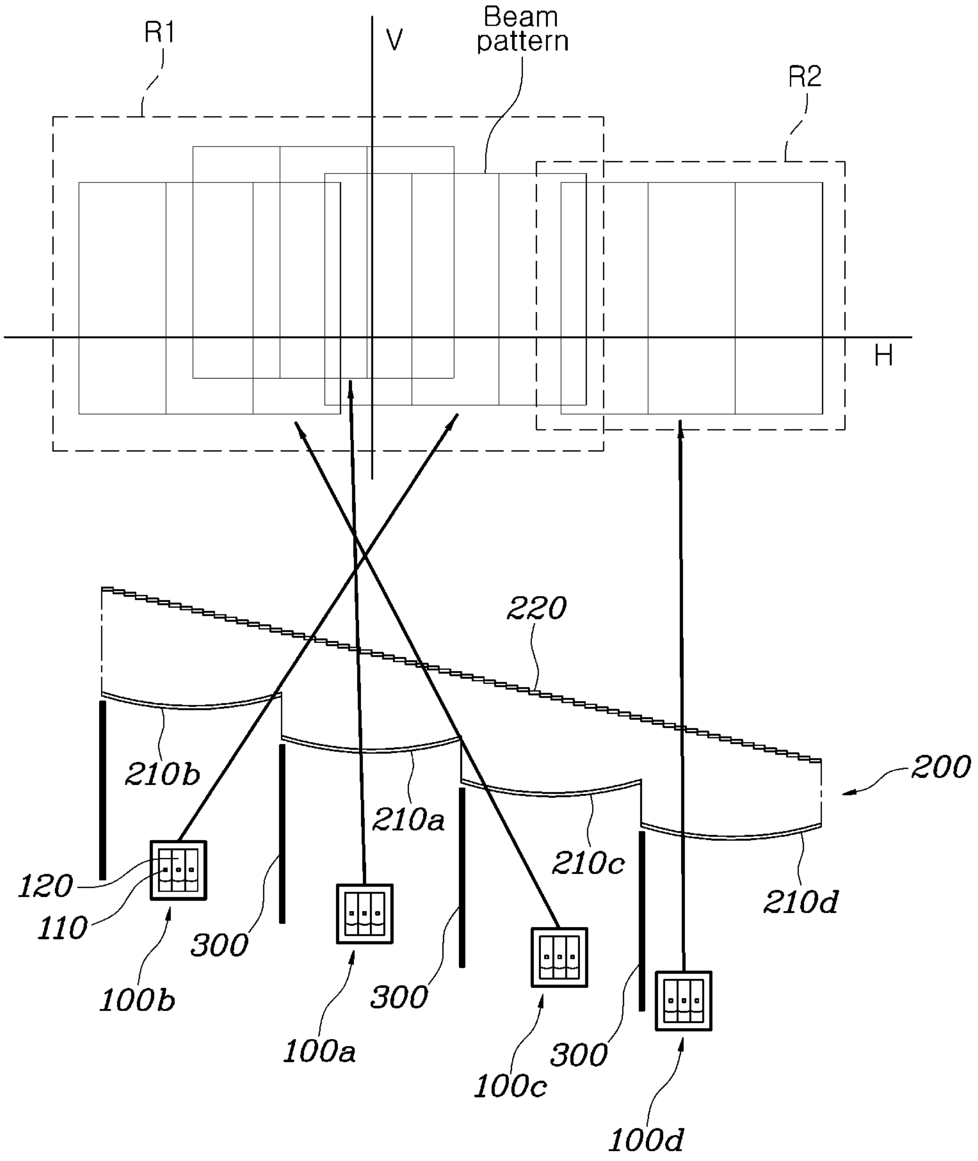
FIG. 11 is a view for explaining the optical module for mobility vehicles shown in FIG. 10.

In another embodiment, an optical module for mobility vehicles, as shown in FIGS. 10 and 11, includes a first light source unit 100*a*, a second light source unit 100*b*, and a third light source unit 100*c*, are which configured to emit light to the light irradiation area. The optical module further includes a transmission lens 200, which is disposed in front of the first to third light source units 100*a*, 100*b*, and 100*c*. The optical module further includes a first transmission portion 210*a*, a second transmission portion 210*b*, and a third transmission portion 210*c*, which respectively match the first to third light source units 100*a*, 100*b*, and 100*c*. Each of the first to third transmission portions 210*a*, 210*b*, and 210*c* includes a light incident surface A formed in an aspherical shape and a light emitting surface B on which a plurality of cells 220 is arranged.

Each of the first to third light source units 100*a*, 100*b*, and 100*c* may include a light source 110 and a reflector 120. The light source 110 may be implemented as an LED. The reflector 120 may be configured to reflect the light emitted from the light source 110 so that the light travels to a corresponding transmission portion of the transmission lens 200. Each of the light source units and the light source 110 included in each of the light source units may be configured to be individually turned on in order to form various beam patterns.

Here, the first light source unit 100*a* may be configured to emit light to the center of the light irradiation area. The second light source unit 100*b* may be located to one side of the first light source unit 100*a*. The second light source unit 100*b* may be configured to emit light such that the light travels in the oblique direction across the center of the light irradiation area. The third light source unit 100*c* may be located to the opposite side of the first light source unit 100*a*. The third light source unit 100*c* may be configured to emit light such that the light travels in the oblique direction across the center of the light irradiation area.

To this end, the second light source unit 100*b* may be disposed eccentrically to one side with respect to the center line of the second transmission portion 210*b*. The third light source unit 100*c* may be disposed eccentrically to the opposite side with respect to the center line of the third transmission portion 210*c*.

Among the light source units configured to emit light to the light irradiation area in order to form beam patterns, the first light source unit 100*a* may form a beam pattern at the center of the light irradiation area. The second light source unit 100*b*, which is disposed eccentrically to one side with respect to the center line of the second transmission portion 210*b* corresponding thereto, may form a beam pattern at a point eccentric to the opposite side of the light irradiation area. The third light source unit 100*c*, which is disposed eccentrically to the opposite side with respect to the center line of the third transmission portion 210*c* corresponding thereto, may form a beam pattern at a point eccentric to one side of the light irradiation area.

Accordingly, the first light source unit 100*a* emits light forward toward the light irradiation area, and the second and third light source units 100*b* and 100*c* emit light toward light such area that travel the irradiation directions of the light emitted therefrom intersect each other. As a result, even when the range of the light irradiation area increases, beam patterns may be formed in the light irradiation area.

In addition, since the second light source unit 100*b* and the third light source unit 100*c* are spaced apart from the first light source unit 100*a* in a direction away from each other, the influence of heat generated from the respective light source units may be reduced, and heat dissipation performance may be ensured.

In addition, a fourth light source unit 100*d* configured to emit light may be further included, and the light irradiation area may be divided into a hot-zone area R1 and a sub-area R2. The first light source unit 100*a*, the second light source unit 100*b*, and the third light source unit 100*c* may be provided to emit light to the hot-zone area R1. The fourth light source unit 100*d* may be provided to emit light to the sub-area R2. Accordingly, the transmission lens 200 may further include a fourth transmission portion 210*d* matching the fourth light source unit 100*d*.

The fourth light source unit 100*d* may include a light source 110 and a reflector 120 and is provided to emit light to the light irradiation area. A sufficient amount of light may be obtained by the additional provision of the fourth light source unit 100*d*.

In other words, the light irradiation area may be divided into a hot-zone area R1 and a sub-area R2. A beam patterns may be formed in the hot-zone area R1 by projection of light to the hot-zone area R1 from the first light source unit 100*a*, the second light source unit 100*b*, and the third light source unit 100*c*. A beam pattern may be formed in the sub-area R2 by projection of light to the sub-area R2 from the fourth light source unit 100*d*. Thus, a sufficient amount of light may be obtained. In this way, since the beam patterns formed by the light source units are distributed to the hot-zone area R1 and the sub-area R2 of the light irradiation area, the visibility of the beam patterns is improved, and thus the marketability of the lamp is increased.

Figure 12:
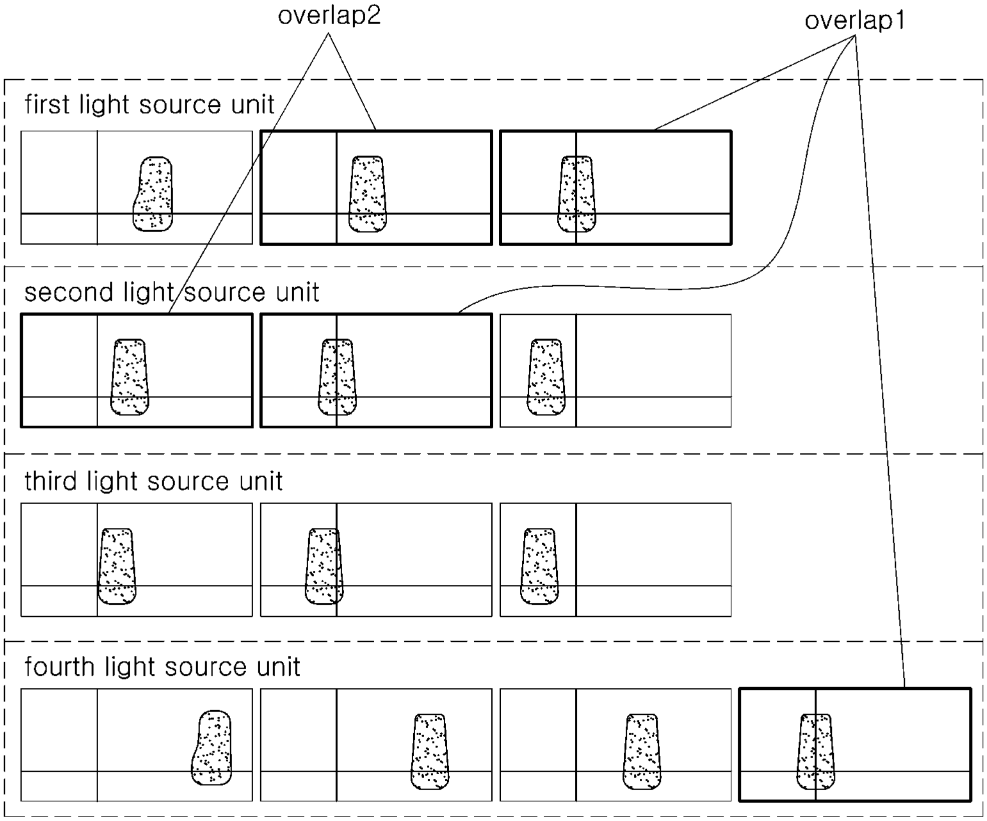
FIG. 12 is a diagram showing beam patterns projected from respective light sources in the optical module for mobility vehicles shown in FIG. 10.

According to the above-described embodiment of the present disclosure, each of the first to third light source units 100*a*, 100*b*, and 100*c* includes three light sources, and the fourth light source unit 100*d* includes four light sources. The light emitted from each of the light sources is projected onto the light irradiation area, and thus a beam pattern is formed. In detail, as shown in FIG. 12, the light sources of each of the light source units 100 may be arranged such that beam patterns are distributed to a plurality of areas with respect to the center of the light irradiation area. Accordingly, a sufficient amount of light may be obtained by adjusting an area of overlap between the light emitted to the light irradiation area from the respective light sources. The visibility of the light irradiation area may be increased by adjusting the distribution of the beam patterns formed by the light emitted from the respective light sources.

Figure 13:
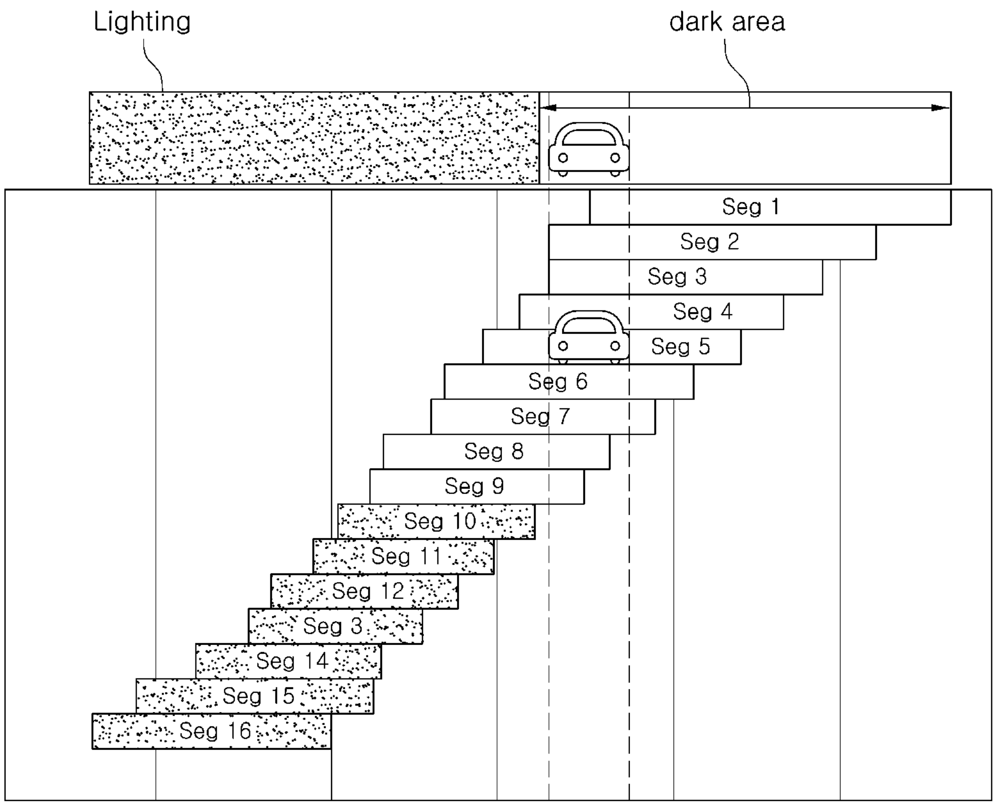
FIG. 13 is a diagram showing beam patterns formed by the conventional art.
Figure 14:
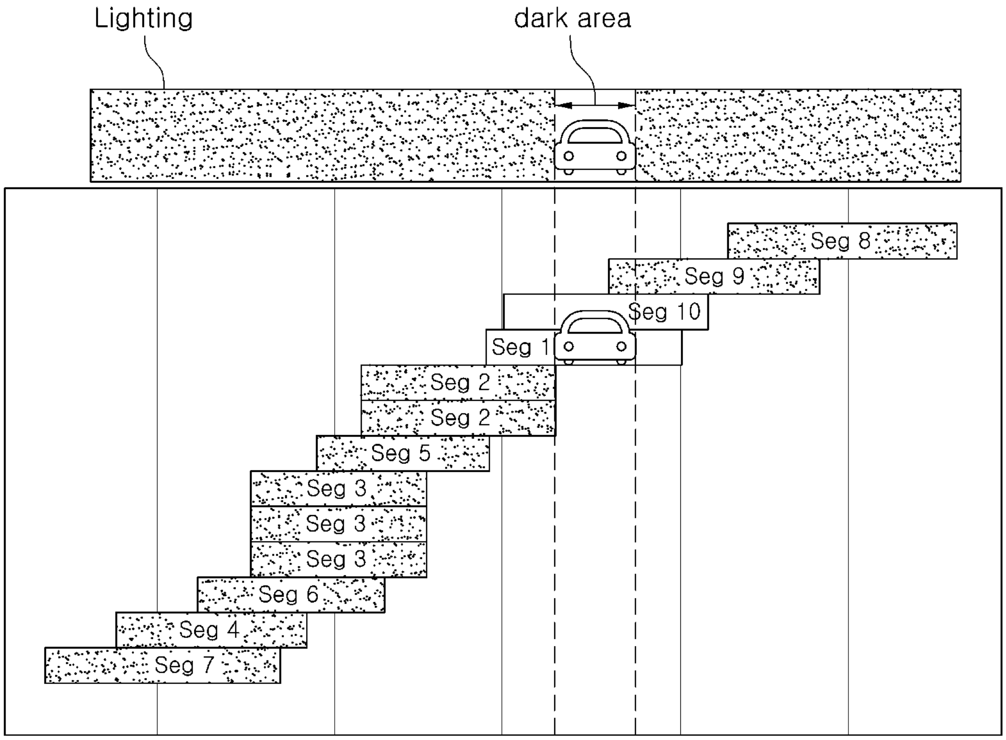
FIG. 14 is a diagram showing beam patterns formed by the optical module for mobility vehicles according to an embodiment of the present disclosure.

In the conventional art, beam patterns are formed as shown in FIG. 13. In this case, however, areas of overlap between the light emitted from a plurality of light sources are excessively large. Thus, a large number of light sources needs to be turned off when a dark area in the light irradiation area is formed. In contrast, according to the present disclosure, as shown in FIG. 14, areas of overlap between the light emitted from the respective light sources are minimized. Accordingly, the number of light sources turned off when forming a dark area in the light irradiation area is reduced, and thus the visibility of the light irradiation area is improved. In addition, it is possible to reduce the total number of light sources, and thus a cost of manufacturing the lamp may be reduced.

As is apparent from the above description, according to the optical module for mobility vehicles configured as described above, the overall size of the optical system is reduced, and thus it is possible to facilitate a package configuration. In addition, a sufficient amount of light and high optical efficiency are ensured through efficient operation of the light sources, and quality of illumination images projected onto a light irradiation area is improved.

Although the embodiments of the present disclosure have been disclosed for illustrative purposes, those having ordinary skill in the art should appreciate that various modifications, additions, and substitutions are possible, without departing from the scope and spirit of the present disclosure as disclosed in the accompanying claims.

What is claimed is:

1. An optical module for mobility vehicles, the optical module comprising:

a plurality of light source units configured to emit light toward focal points; and a transmission lens configured to receive light emitted from the plurality of light source units, the transmission lens comprising a plurality of transmission portions formed so as to respectively match the plurality of light source units, wherein each of the plurality of transmission portions comprises: a light incident surface formed as an aspherical surface, and a light emitting surface having a plurality of cells, wherein each of the plurality of light source units comprises a light source configured to emit light and comprises a reflector configured to reflect light emitted from the light source so that the light travels to a corresponding one of the plurality of transmission portions of the transmission lens, wherein the reflector comprises a reflective surface formed in a parabolic shape in a lateral direction, and wherein the transmission lens is formed such that the light incident surface of at least one of the plurality of transmission portions is tilted in a lateral direction with respect to light incident surfaces of other transmission portions.

2. The optical module according to claim 1, wherein the transmission lens is formed so as to extend in a lateral direction, wherein the plurality of transmission portions is arranged in the lateral direction, and wherein the plurality of light source units is spaced apart from each other in the lateral direction so as to respectively match the plurality of transmission portions.

3. The optical module according to claim 1, wherein the reflector comprises a reflective surface formed in an elliptical shape in a longitudinal direction, wherein the light source is located at a first focal point defined by the elliptical shape of the reflective surface, and wherein the light emitting surface of the transmission lens is located at a second focal point defined by the elliptical shape of the reflective surface.

4. The optical module according to claim 3, wherein the reflector is disposed so that light travels below a third focal point defined by the light incident surface of a corresponding one of the plurality of transmission portions.

5. The optical module according to claim 1, wherein the light source is disposed above the reflector so that light emitted from the light source is reflected by the reflector and passes through the light incident surface and the light emitting surface of a corresponding one of the plurality of transmission portions while traveling from below to above.

6. The optical module according to claim 1, wherein a plurality of light sources is arranged in a lateral direction to emit light to the reflector, and wherein the light incident surface of each of the plurality of transmission portions of the transmission lens is formed to be aspherical in the lateral direction.

7. The optical module according to claim 1, wherein the aspherical surface of each of the plurality of transmission portions of the transmission lens has a regular curvature, and wherein each of the plurality of light source units and a corresponding one of the plurality of transmission portions is spaced apart from each other by a regular distance.

8. The optical module according to claim 1, wherein, as the plurality of transmission portions of the transmission lens has a larger radius of curvature, the plurality of light source units is disposed farther forward so that spacing distances between the plurality of transmission portions and the plurality of light source units decrease, and wherein, as the plurality of transmission portions of the transmission lens has a smaller radius of curvature, the plurality of light source units is disposed farther backward so that spacing distances between the plurality of transmission portions and the plurality of light source units increase.

9. The optical module according to claim 1, wherein one of the plurality of light source units, matching the tilted transmission portion, is disposed at a position shifted in the lateral direction by a tilted angle with respect to the other transmission portions.

10. The optical module according to claim 1, wherein the plurality of light source units is disposed so as to emit light to a light irradiation area, and wherein some of the plurality of light source units are provided so that light emitted therefrom is biased across a center of the light irradiation area.

11. The optical module according to claim 1, wherein some of the plurality of light source units are disposed eccentrically with respect to center lines of corresponding ones of the plurality of transmission portions.

12. The optical module according to claim 1, further comprising partition walls provided between the plurality of light source units to isolate a combination of each of the plurality of light source units and a corresponding one of the plurality of transmission portions from other combinations.

13. An optical module for mobility vehicles, the optical module comprising:

a first light source unit, a second light source unit, and a third light source unit configured to emit light to a light irradiation area;

a fourth light source unit configured to emit light; and a transmission lens disposed in front of the first light source unit, the second light source unit, and the third light source unit, the transmission lens comprising a first transmission portion, a second transmission portion, and a third transmission portion respectively matching the first light source unit, the second light source unit, and the third light source unit, wherein each of the first transmission portion, the second transmission portion, and the third transmission portion comprises: a light incident surface formed as an aspherical surface, and a light emitting surface having a plurality of cells arranged thereon, wherein the light irradiation area is divided into a hot-zone area and a sub-area, and wherein the first light source unit, the second light source unit, and the third light source unit are provided to emit light to the hot-zone area, and the fourth light source unit is provided to emit light to the sub-area.

14. The optical module according to claim 13, wherein the first light source unit is configured to emit light to a center of the light irradiation area, wherein the second light source unit is located to one side of the first light source unit and is configured to emit light such that the light travels in an oblique direction across the center of the light irradiation area, and wherein the third light source unit is located to an opposite side of the first light source unit and is configured to emit light such that the light travels in an oblique direction across the center of the light irradiation area.

15. The optical module according to claim 14, wherein the second light source unit is disposed eccentrically to one side with respect to a center line of the second transmission portion, and wherein the third light source unit is disposed eccentrically to an opposite side with respect to a center line of the third transmission portion.

16. An optical module for mobility vehicles, the optical module comprising:

a plurality of light source units configured to emit light toward focal points;

a transmission lens configured to receive light emitted from the plurality of light source units, the transmission lens comprising a plurality of transmission portions formed so as to respectively match the plurality of light source units; and partition walls provided between the plurality of light source units to isolate a combination of each of the plurality of light source units and a corresponding one of the plurality of transmission portions from other combinations, wherein each of the plurality of transmission portions comprises: a light incident surface formed as an aspherical surface, and a light emitting surface having a plurality of cells, wherein each of the plurality of light source units comprises a light source configured to emit light and comprises a reflector configured to reflect light emitted from the light source so that the light travels to a corresponding one of the plurality of transmission portions of the transmission lens, and wherein the reflector comprises a reflective surface formed in a parabolic shape in a lateral direction.

* * * * *